United States Patent
Papagiannaki (10) Patent No.: US 8,213,323 B1
(45) Date of Patent: Jul. 3, 2012

(54) SYSTEM AND METHOD FOR NETWORK PERFORMANCE MONITORING

(75) Inventor: Konstantina Papagiannaki, Burlingame, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 1323 days.

(21) Appl. No.: 10/737,922

(22) Filed: Dec. 18, 2003

(51) Int. Cl.
*H04L 12/26* (2006.01)

(52) U.S. Cl. ........................... 370/252; 370/246

(58) Field of Classification Search ............ 370/229, 370/230, 231, 233, 234, 235, 241, 247, 252, 370/253, 232, 236, 236.2, 241.1, 251
See application file for complete search history.

(56) References Cited

U.S. PATENT DOCUMENTS

| | | | |
|---|---|---|---|
| 5,867,483 A * | 2/1999 | Ennis et al. | 370/252 |
| 6,222,850 B1 * | 4/2001 | Johnson | 370/445 |
| 6,266,531 B1 * | 7/2001 | Zadeh et al. | 455/453 |
| 6,278,694 B1 * | 8/2001 | Wolf et al. | 370/253 |
| 6,529,954 B1 * | 3/2003 | Cookmeyer et al. | 709/224 |
| 7,020,082 B2 * | 3/2006 | Bhagavath et al. | 370/230 |
| 7,020,282 B1 * | 3/2006 | Chang | 380/44 |
| 7,142,507 B1 * | 11/2006 | Kurimoto et al. | 370/229 |
| 2002/0105911 A1 * | 8/2002 | Pruthi et al. | 370/241 |
| 2003/0023750 A1 * | 1/2003 | Basturk | 709/241 |
| 2003/0128692 A1 * | 7/2003 | Mitsumori et al. | 370/352 |
| 2004/0257999 A1 * | 12/2004 | MacIsaac | 370/252 |
| 2005/0025114 A1 * | 2/2005 | Ware et al. | 370/346 |
| 2006/0083460 A1 * | 4/2006 | Tamil | 385/17 |

* cited by examiner

*Primary Examiner* — Ricky Ngo
*Assistant Examiner* — Eric Kao (57) ABSTRACT

A method and system are provided for monitoring network performance in order to reveal micro-behavior of network traffic. At least two distinct durations are set for monitoring link utilization. At least one link utilization threshold is set for each duration. Link utilization is monitored at a router using a counter. In addition, a number of durations is provided during which the at least one link utilization threshold has been exceeded.

18 Claims, 6 Drawing Sheets

SYSTEM AND METHOD FOR NETWORK PERFORMANCE MONITORING

CROSS-REFERENCE TO RELATED APPLICATION

Not applicable.

STATEMENT REGARDING FEDERALLY SPONSORED RESEARCH OR DEVELOPMENT

Not applicable.

FIELD OF THE INVENTION

The present invention relates to a method and system for network performance monitoring and in particular to identification of micro-congestion episodes in a network.

BACKGROUND OF THE INVENTION

Large-scale Internet Protocol (IP) networks feature hundreds of routers and thousands of links. Monitoring of a network-wide state is usually achieved through the use of the Simple Network Management Protocol (SNMP). Routers collect measurements and report the measurements to a specific location at regular intervals. The regular intervals are typically set to five minutes. The selection of the time interval may be based on the size of the network, since the interval has to be large enough so that it allows the polling of the entire network during a single interval. Additionally, the interval should not be too small to avoid overloading the polled network elements.

The SNMP statistics that are usually collected over the five-minute intervals correspond to average activity of IP links and network elements for the duration of the interval. Within the five-minute interval, the system collects link utilization from every link inside a network. The utilization information is gathered and moved to a network management system in a central location.

Once a network operator decides on the time interval at which network elements are polled, the operator decides on the actual Management Information Base (MIB) metrics on which network elements will report. Usually these MIB metrics include link utilization, packet drops on a per link basis, the CPU utilization of the router itself, etc. In order to avoid router overload and limit the amount of SNMP traffic through the network, network operators usually select a small number of metrics to be polled by the Network Management Station and base their network provisioning decisions on those specific metrics.

Usually routers count how many bytes each link sends. The management station collects byte measurements and subtracts neighboring measurements to determine how many bytes were sent over the five-minute interval. This technique doesn't provide an adequate understanding of what happens during each time interval.

It is not uncommon for a network operator to collect link utilization measurements and infer delay performance based on the collected information. In fact each network provider usually aims for network-wide link utilizations that do not exceed the "acceptable utilization levels". Those levels are specific to each network provider and are frequently set to around 50%. If each link in the network has a utilization level of less than 50%, it is capable of carrying the traffic of any equal-capacity link in its neighborhood in case of failure. Previous analytical work has shown that links having a utilization level of less than 50% introduce minimal queuing delays.

Network management systems typically use the above-identified measurements to determine if a link is overloaded. If the link is overloaded, it may be dropping customer packets or experiencing delays that are likely to violate service level agreements. However, conventional reports of traffic performance across periods of minutes can mask out performance degradation due to short-lived events, such as micro-congestion episodes, that manifest themselves at smaller time scales. Cases may exist in which utilization during the overall time period appears low according to accepted standards, yet packets may be dropped during smaller intervals. During the five-minute intervals, the system may at times be operating at full capacity. No technique is currently available for showing whether links experience small periods of high utilization that lead to increased delays and possibly packet drops within the five-minute intervals.

Accordingly, a system is needed for monitoring network performance at smaller durations within the currently measured intervals. The network management system may continue to gather data at the standard interval. Since the management system collects measurements from an entire network, the collection is asynchronous and collection from different links occurs at different times. If the network management system collects data more frequently, too much traffic will result. Yet, traffic counters collected every five minutes mask out micro-congestion episodes that occur at time scales of milliseconds. Accordingly, a new solution is needed for identifying the time scales in various networks over which micro-congestion episodes occur and for taking the measurements in accordance with the identified time scales.

SUMMARY OF THE INVENTION

In one aspect, the present invention is directed to a method for monitoring network performance in order to reveal micro-behavior of network traffic. The method includes setting at least two distinct durations for monitoring link utilization and setting at least one link utilization threshold for each duration. The method further includes monitoring link utilization at a router and providing a number of durations during which the at least one link utilization threshold has been exceeded.

In a further aspect of the invention, a method for monitoring network performance in order to reveal micro-behavior of network traffic is provided. The method includes setting at least one distinct duration for monitoring link utilization and setting a collection interval for collecting monitored data, wherein the collection interval is larger than the at least one distinct duration. The method further includes analyzing the collected data.

In a further aspect of the invention, a system is provided for monitoring network performance in order to reveal micro-behavior of network traffic. This system is positioned inside a router for the efficient collection of fine-grained traffic measurements. The system relies on the router monitoring link utilization during at least two distinct durations and a threshold monitor for determining whether link utilization during the at least two durations exceeds the at least two distinct thresholds.

In yet another aspect, the invention includes a method for determining parameters for monitoring micro-congestion episodes based on detailed packet information captured on selected links attached to the same router, which may be accurately time-stamped through the Global Positioning System (GPS), inside an operational Internet Protocol (IP) network. The method includes collecting data over at least one time interval having a specified duration, the data including at least a number of packets entering a router and a number of packets exiting the router. The method further includes determining link throughput based on the collected data, calculating delays for each time interval, and relating link throughput with calculated delays. The method further includes selecting at least one monitoring time interval based on the relationship between throughput and calculated delays.

BRIEF DESCRIPTION OF THE DRAWINGS

The present invention is described in detail below with reference to the attached drawing figures, wherein.

DETAILED DESCRIPTION OF THE INVENTION

The study of packet traces collected inside an IP network can help to identify the time scales over which micro-congestion episodes occur. A method is provided that can be easily implemented by a router so that data can be reported at regular intervals such as the standard five minute intervals through SNMP to shed light into the micro-behavior of the carried traffic.

In embodiments of the invention, micro-congestion episodes can be characterized with respect to their amplitude, frequency and duration. Two parameters including a time scale τ and a utilization threshold th are useful in defining frequency, amplitude, and duration of micro-congestion episodes. The amplitude of a micro-congestion episode may be determined by observing statistics collected for a specific time scale τ across different utilization thresholds th. The frequency of a micro-congestion episode may be evaluated by observing the number of intervals of duration τ that report a utilization level greater than a selected utilization threshold th across each 5-minute or other broad collection time interval. The duration of a micro-congestion episode may be evaluated by observing statistics collected for specific values of the utilization threshold th across multiple time scales τ.

Monitoring System

Figure 1:
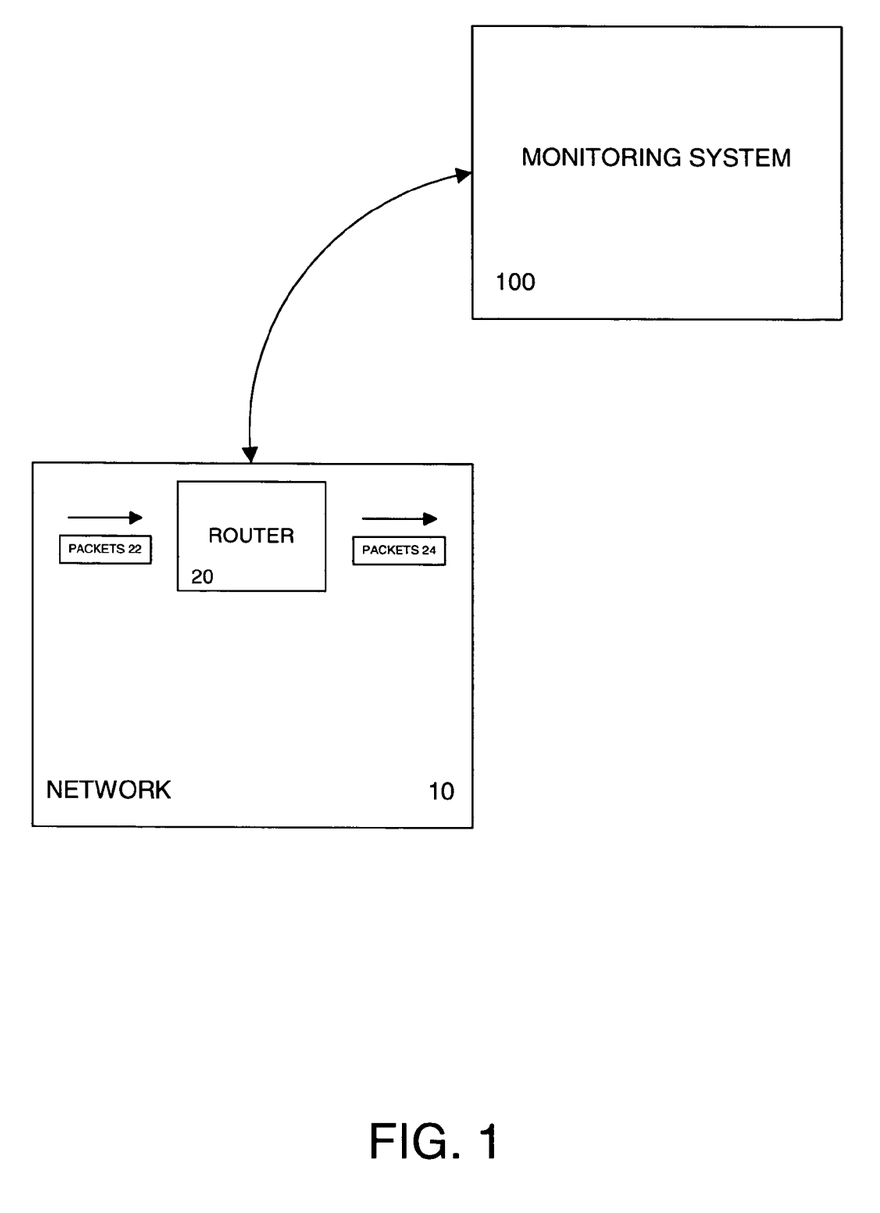
FIG. 1 is a block diagram showing an embodiment of a system of the invention.

A system in accordance with an embodiment of the invention is shown in FIG. 1. A network 10 includes a router 20. Incoming packets 22 and outgoing packets 24 travel through the router 20. A collection system 100 collects data from the router 20. The router 20 may be contained within the network 10, and in an embodiment of the invention, the network 10 is a Sprint™ Tier-1 IP backbone network.

Figure 2:
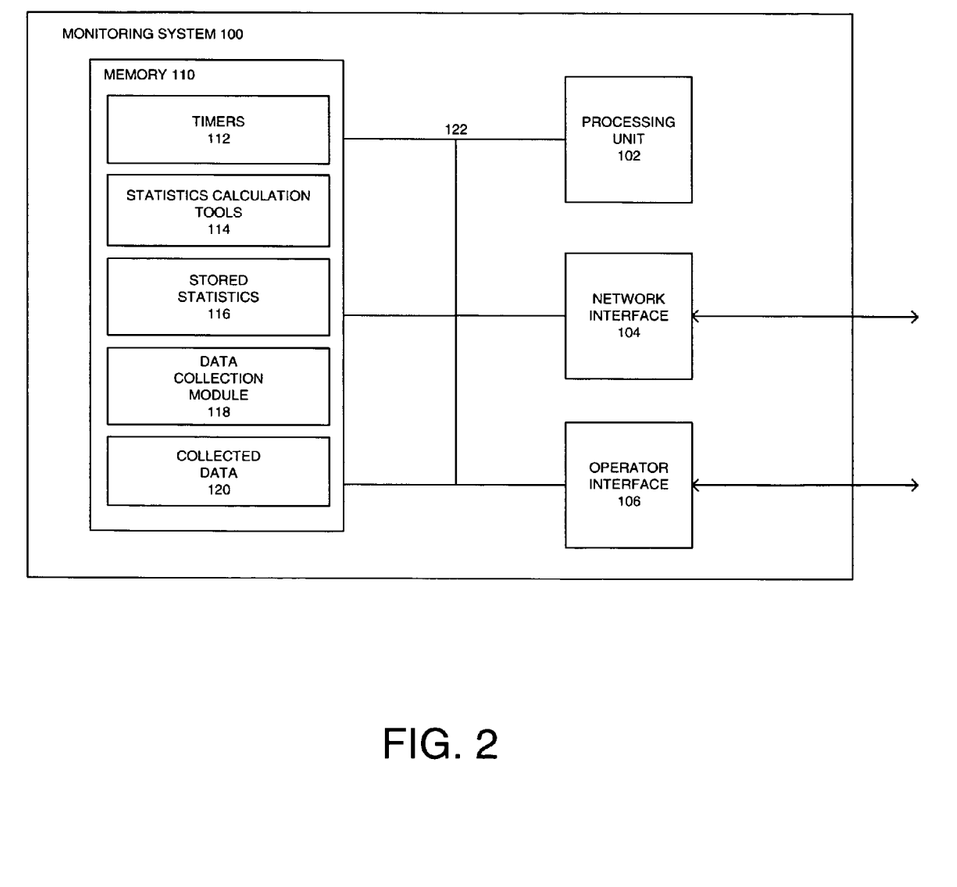
FIG. 2 is a block diagram showing details of a monitoring system of the invention.

FIG. 2 illustrates an embodiment of the monitoring system 100. The monitoring system 100 exists as part of the router 20. Given that this monitoring system may collect 300,000 or more measurements within a 5-minute interval, it would be impractical to export the information. Accordingly, the collected information is processed at the router. The monitoring system 100 may be a part of the router 20 or a specialized card inside the router.

The monitoring system 100 may include a processing unit 102, a network interface 104, and an operator interface 106. The monitoring system 100 may further include a memory 110 including application programs for performing methods in accordance with embodiments of the invention. A system bus 122 may be provided to couple various system components including the system memory to the processing unit 102. Each of the aforementioned components is further described below.

The memory 110 is shown as a generalized memory and may include timers 112, statistics calculation tools 114, and stored statistics 116. A data collection module 118 collects data 120 for use by the aforementioned modules. The statistics calculation tools may be described in the general context of computer-executable instructions, such as program modules, being executed by a computer. Generally, program modules include routines, programs, objects, components, data structures, etc. that perform particular tasks or implement particular abstract data types.

The monitoring system 100 implements the timers 112 for different durations of τ. When the timer expires, the data collection module 118 collects the number of bytes transmitted by each one of the interfaces through the duration τ. Then, given the capacity of the links, the statistics calculation tools 114 compute the link utilization by dividing the collected number of bytes with the capacity of the link. The monitoring system 100 then bins the computed utilization value according to the desired granularity by applying selected thresholds. If the computed utilization value is greater than th, the data collection module 118 increases the counter corresponding to the number of intervals exceeding th. At the end of the 5-minute interval, the monitoring system 100 inside the router transmits the number of intervals exceeding specific threshold values for the different time scales. Alternatively, the monitoring system 100 stores the information in as stored statistics 116 and the network operator could access the statistics through an operator interface.

The memory 110 is shown as a generalized memory, but may include a variety of computer readable media. By way of example, and not limitation, computer readable media may comprise computer storage media and communication media. The system memory 110 may include computer storage media in the form of volatile and/or nonvolatile memory such as read only memory (ROM) and random access memory (RAM). A basic input/output system (BIOS), containing the basic routines that help to transfer information between elements within system 100, such as during start-up, is typically stored in ROM. The RAM typically contains data and/or program modules that are immediately accessible to and/or presently being operated on by processing unit 102. By way of example, and not limitation, the memory 110 includes an operating system, application programs, other program modules, and program data.

In addition to the memory 110, the monitoring system 100 may also include other removable/nonremovable, volatile/nonvolatile computer storage media. By way of example only, a hard disk drive may read from or write to nonremovable, nonvolatile magnetic media, a magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive would typically be connected to the system bus 122 through a non-removable memory interface and the magnetic disk drive and optical disk drive are typically connected to the system bus 122 by a removable memory interface.

A user may enter commands and information into the monitoring system 100 through the operator interface 106 using input devices such as a keyboard and pointing device, commonly referred to as a mouse, trackball or touch pad. A monitor or other type of display device may also be available to the operator. An operator may access the monitoring system 100 inside the router 20 through a networked environment using a remote computer. Furthermore, the monitoring system 100 inside the router 20 is able to access network interfaces to collect utilization metrics at different time scales.

The monitoring system environment 100 is only one example of a suitable computing environment and is not intended to suggest any limitation as to the scope of use or functionality of the invention. Neither should the monitoring system environment 100 be interpreted as having any dependency or requirement relating to any one or combination of components illustrated in the exemplary monitoring system environment 100. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

Monitoring Method

Figure 3:
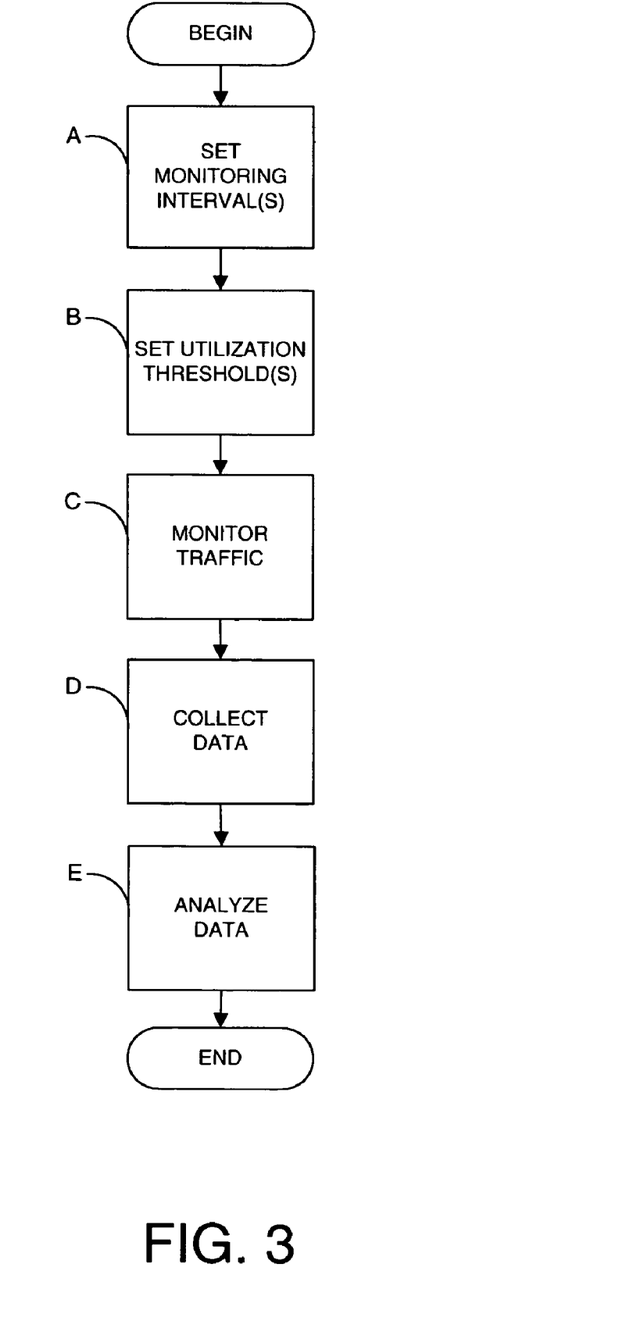
FIG. 3 is a flow chart illustrating a method for monitoring network traffic in accordance with an embodiment of the invention.

FIG. 3 illustrates a monitoring method in accordance with an embodiment of the invention. In a procedure A, an operator sets one or more monitoring intervals $\tau$. In procedure B, the operator sets one or more utilization thresholds th. In a procedure C, the system monitors traffic through the router 20. In procedure D, the monitoring system 100 collects data from the router 20 and in procedure E the collected data is analyzed.

As set forth above, evaluation of the amplitude, duration, and frequency of a micro-congestion episode requires determination of one of more appropriate time scales $\tau$ and appropriate utilization thresholds th.

In accordance with procedure A, the choice of the appropriate value of $\tau$ is not trivial. If the value of $\tau$ is too small, then high throughput values may relate to the simple transmission of a small number of packets back to back. Regarding procedure B, the choice of the appropriate threshold th may be determined in accordance with the characteristics of the network and the terms of customer service level agreements. These procedures are further discussed below.

Determining Collection Parameters $\tau$ and th

As set forth above, analysis of data monitored at five-minute intervals has proven inadequate for characterizing micro-congestion episodes. Accordingly, a more useful time period should be determined. In order to determine a useful time period, it is generally necessary to empirically examine multiple time scales. For instance, if the number of congested intervals at the smallest time scale is high and the number of congested intervals at the next coarser time scale is low, the congested intervals at the smallest time scale are not sequential and thus their impact on network performance is limited.

A method is provided for determining at what time scales measurements should be made. While the resultant time scales impact actual data monitoring time periods, the selected time scales will have no effect on the timing of reporting to the collections system. The monitoring interval selected in procedure A is distinct from the collections process of procedure D. In procedure D, the measurements may continue to be reported at five-minute intervals or any other currently used interval. The total amount of traffic flowing on a link computed over intervals of different duration can exhibit great variations. Traffic burstiness is likely to demonstrate itself through high throughput values at time scales of milliseconds, while throughput measurements collected over intervals on the order of minutes are likely to be within the provider's acceptable utilization levels. Accordingly, it is necessary to find appropriate values for the timescale $\tau$, over which throughput measurements should be collected in order to reveal performance degradation due to traffic burstiness at small time scales.

The choice of the appropriate value of $\tau$ is not trivial. If the value of $\tau$ is too small, then high throughput values may relate to the simple transmission of a small number of packets back to back. If the system monitors at one millisecond time scales, it may see indications of full utilization without delay. Transmission Control Protocol (TCP), the dominant Internet protocol, has a maximum size of window of packets that it can send simultaneously. If TCP sends a full window of packets that arrive at the router's incoming interface back to back, in the absence of cross-traffic, these packets will appear back to back at the output link, if it is of the same capacity as the input link. If the measurement interval contains those TCP packets alone, the measured utilization level is 100%. However, packets have experienced no queuing delay since they arrived at an equal-speed link and faced no cross-traffic. Consequently, high output throughput values in this case do not correspond to increased delays through the router.

Therefore, exclusive use of very small time scales such as a one-millisecond time scale may not be optimal. A minimum time frame exists at which results will make sense. Accordingly, if a small time scale such as one millisecond is used, in many instances, the results would only be instructive if the system can determine how many back to back one millisecond periods show full utilization. With a large number of consecutive full utilization measurements, some packets will start experiencing queuing. If the utilization levels persist, the monitoring system can continue to expand the time period until the utilization levels decrease.

In order to determine the duration of micro-congestion episodes, monitoring equipment can monitor every data packet at an input link of a router and at an output link of a router with very accurate time stamps. Time stamps may be GPS synchronized and can give accuracy down to a microsecond. It is then possible to determine which of the input packets were transmitted from the monitored output link and how much time each packet took. This information helps to determine the utilization of the output links. If the utilization were too low, the delay would be zero. If the packet doesn't experience any delay, then the time scale may be too small to permit conclusions about what happens to the packets.

Accordingly, the examination of a single time scale may generally be inadequate for determining the effects of micro-congestion episodes. At small time scales, an examination may reveal that congestion occurs but will not reveal the duration of the congestion. It is also necessary to determine the duration of the congestion in order to assess overall effects.

In interpreting results, if a small time scale such as the 1 ms time scale reports high utilization levels over a link, delays may or may not occur. By looking at a larger time scale, such as 10 ms, the delays can be more accurately revealed. If the 10 ms time scale shows much lower utilization levels, the operator can infer that the any existing delays are not having lasting adverse effects. If utilization levels are still high at 10 ms, delays and/or drops may be occurring.

It is important for network operators to identify delays since delays may cause violations of customer level agreements. For instance, a customer level agreement might promise a 30 ms delivery. If it takes 28 ms to deliver a packet without delays, any delay exceeding 2 ms will cause the customer level promise to be broken. Drops are an extreme case. Packets will be dropped if the queue is full.

On the other hand, if the value of $\tau$ is too large, the results may have no relevance to the time scale at which queues are building up inside the router. The maximum time scale of relevance for the definition of micro-congestion episodes should be related to the total amount of buffering available to packets while transiting the router. This latter time scale is useful for analyzing the loss characteristics of the network, but it may be too large for bounding the delay through each node. In reality even a small queue buildup of 1 ms may be considered prohibitive if it occurs frequently in space and/or time.

In procedure B, the utilization thresholds may be pre-set to 50% . . . 60%, or other threshold. The thresholds are required because otherwise the system would be required to process an excessive number of measurements. The network operator can set whichever thresholds are interesting when the characteristics of the network are considered.

Accordingly, in view of the factors described above, it may be necessary to experiment with multiple time scales and multiple thresholds in particular networks in order to accurately detect micro-congestion episodes within the network, since they need to capture the characteristics of each link monitored.

Monitoring and Collection

In order to assess the overall impact of micro-congestion episodes, it is advantageous to examine multiple time scales simultaneously. In the proposed method, each router keeps counters of utilization at multiple time scales. In procedure D, every five minutes (or other selected time period), the router reports how many of the periods from each time scale (for example, how many 1 ms intervals and how many 10 ms intervals) exceed a pre-set utilization threshold.

Monitored time periods may be overlapping. For instance, in a 10 ms time period, the network operator may choose to monitor the 1 ms time span, a 5 ms time span and the entire 10 ms time span. Furthermore, if data collection occurs every five minutes, the five minutes can be divided into the aforementioned intervals. The router could use multiple timers and whenever a timer expires, the router can compute how many bytes are sent out from a particular link. Using this technique, for each five-minute period, the operator will know how many time periods exceeded the threshold(s). The data will not reveal which monitored time periods exceeded the threshold, but may reveal how many time periods experienced utilizations exceeding the pre-set thresholds.

An output link utilization analysis at different time scales and for different values of the "acceptable utilization levels" or thresholds will help to characterize the frequency of micro-congestion episodes. If a micro-congestion episode is persistent, then its effect should be significant across multiple time scales. For instance, if a link experiences a micro-congestion episode that lasts for multiple, sequential 1 ms intervals, then its effect will "leak" into the higher analyzed time scale, in this case 10 ms. Thus, one way to identify the persistence of micro-congestion episodes in time is by analyzing link utilization at multiple time scales simultaneously.

Embodiments of the method of the invention characterize micro-congestion episodes with respect to their amplitude, frequency and duration. The approach relies on the analysis of link utilization at multiple time scales simultaneously and can provide insight into the time scales at which congestion occurs, while offering information that cannot be recovered by similar analysis at a single time scale.

In procedure C, the router(s) 20 perform monitoring tasks. Optical splitters may be disposed on selected links inside a selected network. In one embodiment, the system captures the first 40 bytes seen on each unidirectional IP link. The collected data sets or packet traces list every packet seen on the monitored link for a specific duration of time (usually limited by the amount of disk space available at the collection station) along with accurate GPS timestamp for its transmission on the link.

The participating routers may be characterized as "virtual output queued switches" and delays experienced by packets through them are not due to output queuing alone. The single-hop delay can be computed for the matches as the difference between the departure and arrival timestamp of a packet at the router. These delay measurements characterize the delay performance experienced by packets on the router path between the monitored input and output link. Nevertheless, the output link receives traffic from other input interfaces, and the input link sends packets to other non-monitored output links. The collected single-hop delay measurements approximate a random sample for the delays experienced by any packet on the monitored output link. Thus, the collected data are representative with respect to the amount of time packets need to transit the monitored router and get transmitted from that specific output link.

Analysis Procedure

After the periodic collection of procedure D, amplitude analysis may be performed in procedure E. Procedure E determines the amplitude of a micro-congestion episode by observing statistics collected for a specific time scale across different utilization thresholds. Procedure E further computes the duration of a micro-congestion episode by observing statistics collected for specific values of the utilization threshold across multiple time scales. Finally, the analysis procedure E may evaluate the frequency of a micro-congestion episode by observing the number of intervals of a specific duration that report a utilization level greater than a pre-selected threshold during the collection interval.

Analysis in Exemplary Embodiment

An empirical study of packet traces collected inside the Sprint™ Tier-1 IP backbone network was carried out to identify the time scales over which micro-congestion episodes manifest themselves. In an exemplary embodiment, a method of the invention collects and analyzes four packet traces collected inside the network from OC-3 and OC-12 capacity links. Results were obtained for optical carriers such as OC-3 and OC-12. The designations of OC-3 and OC-12 are used to specify the speed of fiber optic networks. Transmission speeds for OC-3 are typically 155.52 Mbps and for OC-12 are typically 622.08 Mbps.

These packet traces are selected because they correspond to pairs of monitored links that attach to the same router inside the network. Each pair of packet traces may be labeled as a data set. Those packets that are common to both incoming and outgoing links are identified and referred to as matches. Table 1 includes information about the collected packet traces.

TABLE I

DETAILS OF TRACES

| Set | Link | Speed | #pkts | Avg. Util. | #matches |
|---|---|---|---|---|---|
| 1 | in1 | OC-3 | $793 \cdot 10^6$ | 70 Mbps | $3 \cdot 10^6$ |
|   | out1 | OC-3 | $567 \cdot 10^6$ | 60 Mbps |   |
| 2 | in2 | OC-12 | $1.3 \cdot 10^9$ | 150 Mbps | $18 \cdot 10^6$ |
|   | out2 | OC-12 | $1.1 \cdot 10^9$ | 250 Mbps |   |

The amplitude of a micro-congestion episode can be detected through its impact on the delay experienced by packets through a single node. For each interval n of duration $\tau$ the collected delay measurements for the packets that departed within that interval form a set of measurements $\{D(n)\}$. The total number of packets seen on the output link for the same interval n can be used to compute link throughput B as the total amount of traffic transmitted in that same interval. The link throughput value B can be associated with the set of delay measurements $D(B)=\{D(n)\}$ and examined for the remainder of the trace. If a later interval n is characterized by the same throughput value B, the set D(B) can be augmented with the new delay measurements $\{D(n^1)\}$. At the end of the trace, each link throughput level (quantized per 1 Mbps) is associated with a delay distribution.

These results describe the delay behavior experienced by packets for specific levels of output link utilization. The results also describe the relationship between the intensity of an output burst and the probability of increased delay due to cross-traffic. If the link utilization is high and the delays measured are high, then measurements reveal buildup of queues inside the router. If the link utilization is high and the delays experienced are small, then measurements simply reveal packets going through the router at line rate.

Implementing the analysis described above, the router was used to measure link throughput at intervals of duration $\tau$ equal to 1 ms, 10 ms, 100 ms, 1 sec and 5 minutes and to investigate the relationship between the delays experienced by packets while transiting the monitored router and further to investigate the output link utilization.

Amplitude Analysis for OC-3 Links

Each level of utilization B is accompanied by a delay distribution. The results characterize the obtained distribution using the minimum, represented by curve 29, average, represented by curve 30, 90th percentile, represented by curve 31, and 99th percentile represented by curve 32. All statistics are computed for the levels of link utilization that feature at least 100 delay measurements. The results are summarized in FIG. 4 and FIG. 5.

Figure 4:
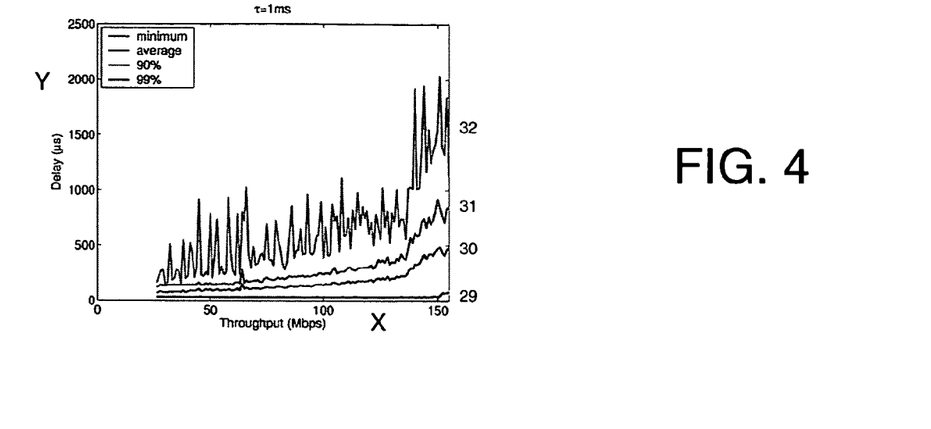
FIG. 4 is a graph illustrating a relationship between output link utilization and single-hop delay for a first interval in a first network.

FIG. 4 presents the delay statistics measured for each level of output link utilization for the OC-3 links when $\tau$ is equal to 1 ms. Link throughput measured over intervals of 1 ms duration approaches the link capacity (155 Mbps) and is accompanied by delays as large as 2 ms through the monitored router. The minimum delay reported for each level of output link utilization is approximately the same across the entire range of possible utilizations. This observation indicates that packets may experience minimal delays during a highly utilized interval. Nevertheless, a significant number of packets is likely to spend milliseconds of delay through a single node. Consequently, measurements of output link utilization at 1 ms intervals are able to reveal the amplitude of micro congestion episodes. Curves 29-32 illustrate minimum, average, 90%, and 99% values respectively.

Figure 5:
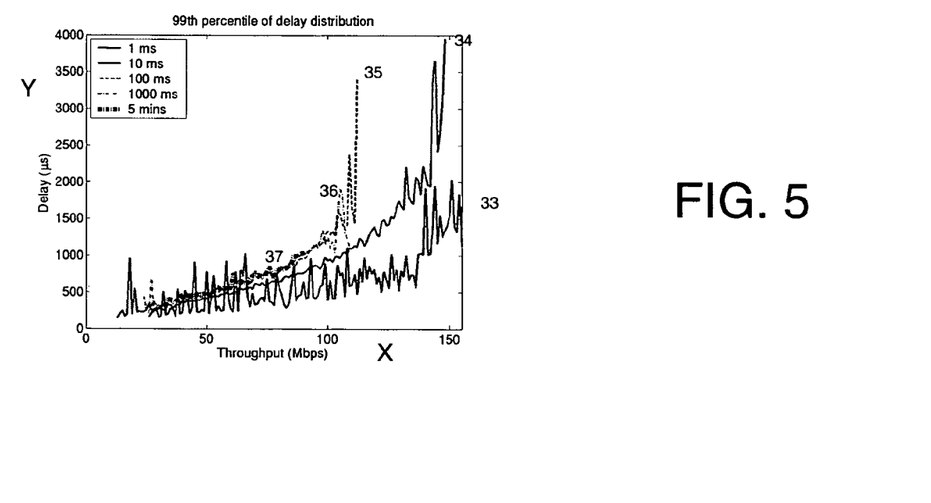
FIG. 5 is a graph showing a relationship between output link utilization and the delay distribution for different intervals in the first network.

In FIG. 5, the relationship of the time interval $\tau$ to output link utilization is shown at higher values of $\tau$. FIG. 5 presents the relationship between the 99th percentile of the delay distribution and the output link utilization for different values of $\tau$. Output link utilization measured at 1 ms, shown by curve 33, and 10 ms, shown by curve 34, may reach the link capacity despite the fact that a 5 minute average hardly reaches 60%. In addition, the 99th percentile of the delay distribution reaches higher values when $\tau$ is equal to 10 ms and significantly drops for values of $\tau$ greater than 1 sec. Curves 35-37 represent 100 ms, 1000 ms, and 5 minute intervals respectively.

Delay measurements for the first data set occasionally exceed 1 ms with a maximum value of 4 ms. As a result, when $\tau$ is equal to 1 ms, there will be packets in the data set that remain inside the router for multiple 1 ms intervals. Since our monitoring approach reports delay measurements only when the packets are seen at the output link, delay measurements lag behind the utilization measurements. Accordingly, the 99th percentiles reported at $\tau=1$ ms are smaller than measurements at $\tau=10$ ms. This result is an artifact of methodology of relying on packets exiting from the monitored output link to measure the delay experienced through the router. Passive measurements on the router itself could correctly reveal the amplitude of the episode also at the 1 ms time scale. Given that the 99th percentile of delay measurements across the entire trace does not exceed 4 ms, which is correctly measured at 10 ms intervals, both time scales of 1 ms and 10 ms could accurately reveal the magnitude of micro-congestion episodes for the first data set. The 99th percentile of the delay distribution reported when $\tau=5$ minutes is 1 ms, which is significantly smaller than 4 ms. Thus, computing the delay percentile for longer periods of time is likely to hide increased delays that persist for smaller periods of time.

Based on the relationship between delay and output link utilization, a network operator could select the "acceptable" link utilization levels that relate to acceptable delays through each node. For instance, if one considers 1 ms of delay through a single node to be prohibitive then links should not be allowed to exceed 70% utilization at a 10 ms timescale and 55% utilization at 100 ms timescale. In that case, 99% of the packets going through the router will experience single-hop delays less than 1 ms.

Amplitude Analysis for OC-12 Links

Figure 6:
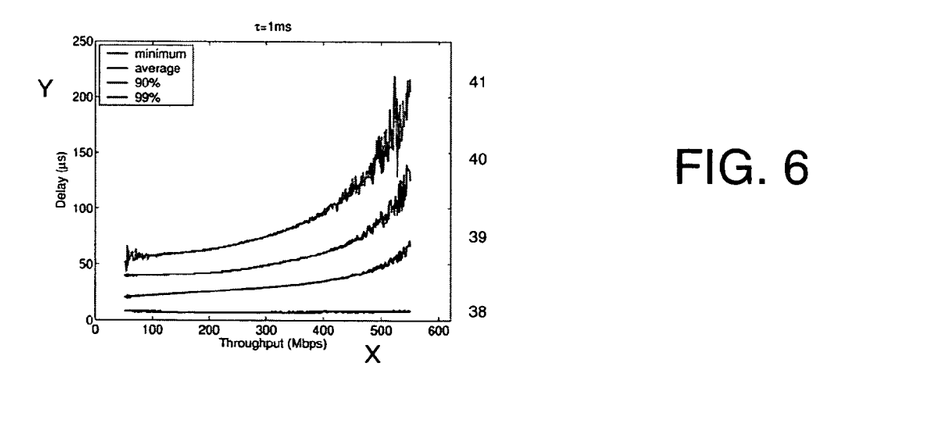
FIG. 6 is a graph illustrating a relationship between output link utilization and single hop delay during the first interval in a second network.
Figure 7:
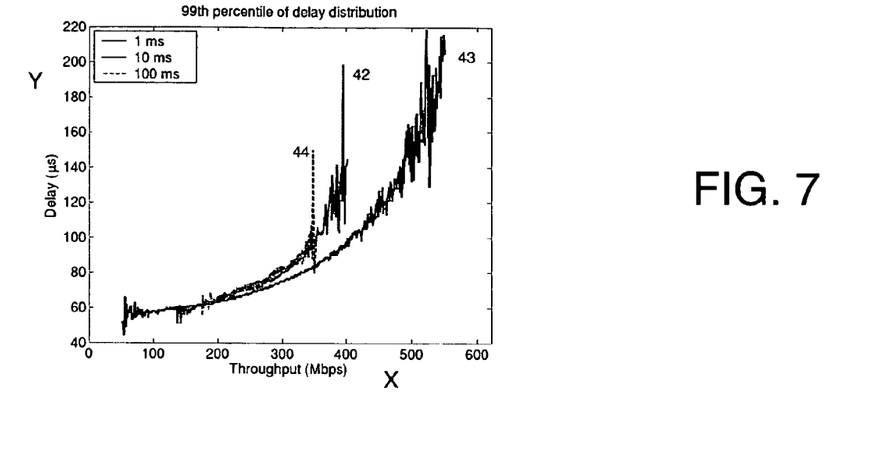
FIG. 7 is a graph illustrating a relationship between output link utilization and the delay distribution for different intervals in the second network.

The second set of data is collected from two OC-12 links. FIGS. 6 and 7 illustrate the relationship between experienced delays and output link utilization found using the methodology described above. In FIG. 6, curves 38-41 represent minimum, average, 90%, and 99% values respectively. In FIG. 7, curve 43 represents 1 ms, curve 42 represents 10 ms, and curve 44 represents 100 ms intervals.

The output link utilization for the OC-12 set is much lower than the output utilization for the OC-3 set even when measured over 1 ms time intervals. As a consequence, and due to the higher link rate, delay measurements for the second data set are much lower. The maximum delay in the data set is 500 µs. In addition, due to the increased line rate the differences between small and large time scale output link utilization measurements are far more significant.

The output link utilization computed over 5 minute intervals hardly exceeds 300 Mbps (i.e. 40%). Nevertheless, the output link utilization measured over 1 ms intervals reaches 97%. The amplitude of the micro-congestion episodes is better revealed when measurements are taken at 1 ms intervals. The 99th percentile of the delays experienced by packets during the "overloaded" 1 ms time intervals is 250 µs as shown by curve 41 of FIG. 6, while the respective statistic reported over 5 minute intervals is 70 µs. The fact that the 99th delay percentile significantly drops for 10 ms and 100 ms time intervals indicates that the micro-congestion episodes occur infrequently, thus affecting a small number of packets in total.

The above analysis shows that micro-congestion episodes can be better revealed in the investigated networks when measurements are taken at intervals of duration equal to or below 10 ms. Given specific delay values that are considered prohibitive, one can identify the link utilization levels that should not be exceeded for bounded delay performance for each set. These thresholds are likely to be defined by the network operator and in accordance to the Service Level Agreements (SLAs) in place. As set forth above, the impact of higher output link utilization on the delay experienced by packets is not a function of the amplitude of the micro-congestion episodes alone, but also the frequency of these episodes and their duration.

OC-3 Frequency and Duration Results

Figure 8:
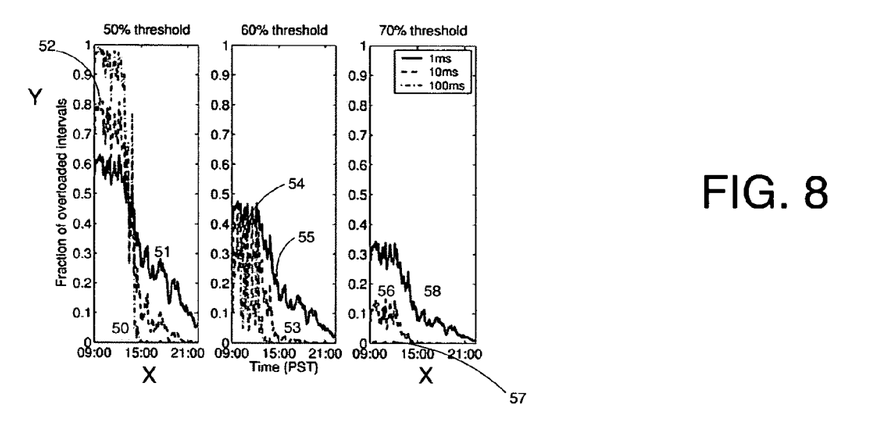
FIG. 8 is a graph illustrating a fraction of overloaded intervals across time for different thresholds and intervals in the first network.

The system may analyze the output packet trace "out2" and compute link throughput at the time scales of 1 ms, 10 ms, and 100 ms since these time scales can better reveal the amplitude of an episode as shown above. Then, for different values of th, the method counts the number of intervals within each 5-minute interval in the trace that exceed the specified threshold values. FIG. 8 illustrates the results for three time scales and three different values of the as illustrated by curves 50-58. Curve 50 represents 100 ms, curve 51 represents 1 ms, and curve 52 represents 10 ms intervals. Curves 53-55 represent 10 ms, 100 ms, and 1 ms intervals respectively. Curves 56-58 represent 10 ms, 100 ms, and 1ms intervals respectively.

When th is set to 50%, approximately all the 100 ms intervals until 3 pm can be characterized as "congested". Nevertheless, not all 1 ms have utilizations exceeding 50%. Therefore, at 1 ms intervals utilization may be less than 50%. The fact that utilization measured at 10 ms still exceeds 50% indicates that when 1 ms intervals exceed 50% utilization they exceed it significantly. Indeed, when th=70%, 30% of the 1 ms intervals are characterized as "congested". Such a finding verifies the conclusion that throughput measured at the finest time scale can greatly fluctuate with time.

When the threshold value is set to 60%, the highest fraction of "congested" intervals is reported by the 1 ms timescale, but does not equally affect the measurements at higher time scales. Consequently, utilization measurements collected at 1 ms intervals are likely to exceed 60% but do not persist in time and result in lower values at coarser time scales. Once the threshold is set to 70% the difference in the fraction of "congested" intervals across time scales is even greater.

OC-12 Frequency and Duration Results

Figure 9:
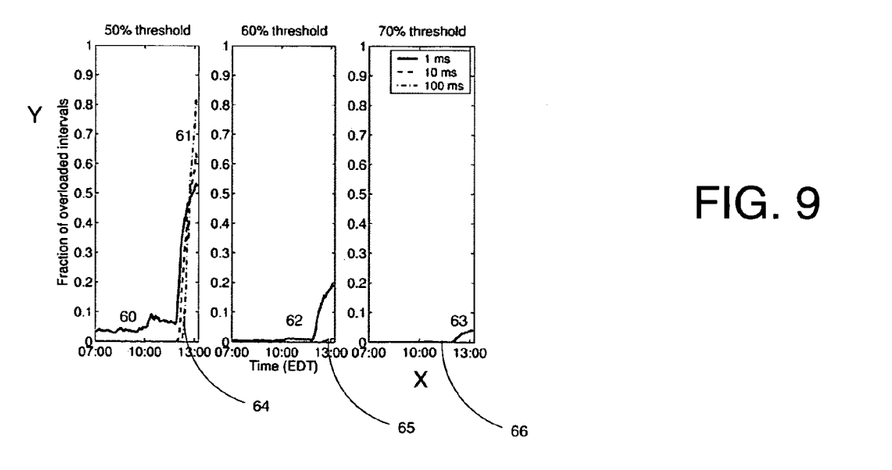
FIG. 9 is a graph illustrating the fraction of overloaded intervals across time for different thresholds and intervals in the second network.

FIG. 9 shows results for the OC-12 data set for τ equal to 1 ms, 10 ms, and 100 ms and th equal to 50%, 60% and 70% as shown by curves 60-63. The time scales of 10 and 100 ms report a greater number for the fraction of overloaded intervals only when th=50%. The largest number of "congested" intervals occurs toward the end of the trace after 12 pm local time. Link utilization measurements at 1 ms intervals rarely exceed 70% (their fraction is less than 5%) and only marginally exceed 60% (their fraction reaches 20% at most). Curves 60, 61, and 64 represent 1 ms, 10 ms, and 100 ms intervals respectively. Curves 62 and 63 represent 1 ms intervals. Curves 65 and 66 approximate both 10 and 100 ms intervals.

Consequently, the number of micro-congestion episodes in the OC-12 data set is significantly smaller but not negligible. The amplitude of these episodes hardly reaches 60% and accordingly, their impact on observed packet performance will be limited.

In summary, by looking at time scales below 100 ms and across different values of th, the system can characterize the amplitude of the micro-congestion episode. If the throughput measured at 10 ms is greater than 60%, then delays may be significant. By observing the results for the same value of the and across time scales, the system is capable of identifying the duration and frequency of the episodes. For instance, if high values of threshold are accompanied by high fraction of overloaded intervals for the smallest time scale alone, it is likely that the micro-congestion episodes do not last for long periods of time.

Figure 10:
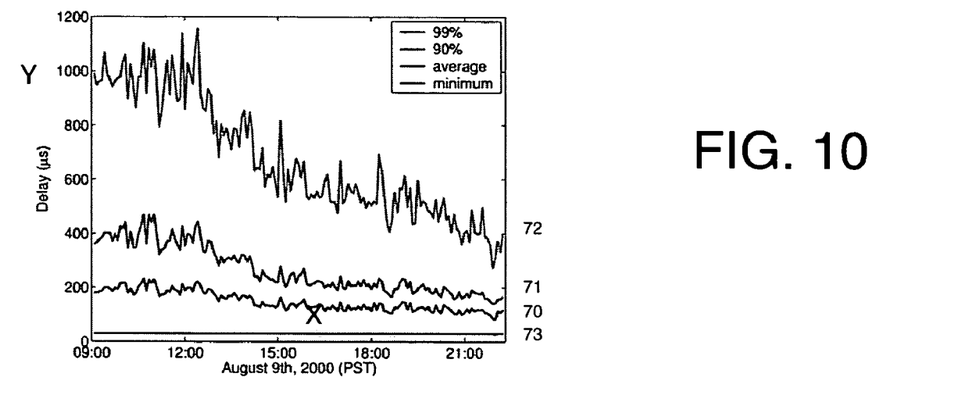
FIG. 10 is a graph showing delay statistics computed over five minute intervals in the first network.
Figure 11:
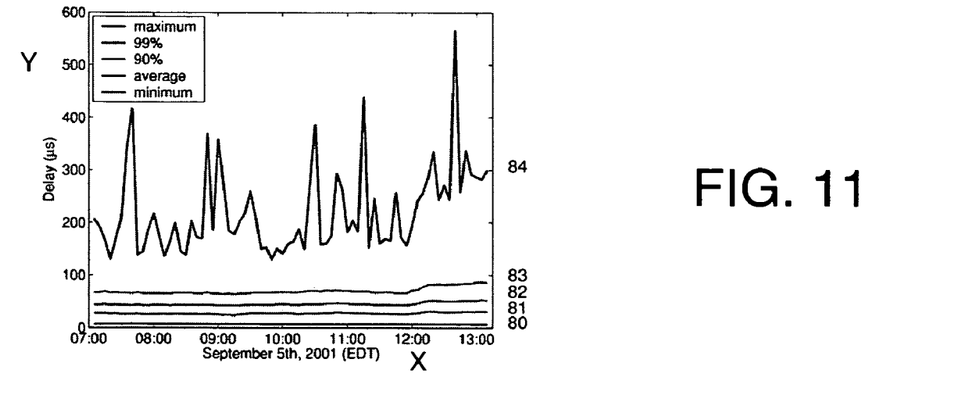
FIG. 11 is a graph illustrating delay statistics computed over five minute intervals across time in the second network.

The proposed SNMP metric (FrOverload(τ,th)=fraction of intervals of duration τ within a 5-minute interval that exceed utilization level th) will be useful within an operational context if it is able to reveal congestion through time in a way that actually relates to degradation in performance. FIGS. 10 and 11 show delays experienced by packets for the two data sets during the entire duration of the trace. FIGS. 10 and 11 show the delay statistics collected for each 5-minute interval in the trace for data sets 1 and 2 respectively.

FIG. 10 shows, through curves 70-73, that packets going through the monitored router may experience delays that reach 1 ms. Curves 70-73 represent average, 90%, 99%, and minimum values respectively. Nevertheless, this behavior is only observed for the first part of the trace until 3 pm. After 3 pm the measured delays show a significant drop. From an operational standpoint it would be beneficial to identify the time in which packets experience larger delays and what the delay amplitudes are.

As shown in FIG. 11, all three time scales report utilization levels greater than 50% until 3 pm. In addition, until 3 pm, 30% of the 1 ms measurements in each 5-minute interval exceed 70% utilization. Therefore, micro-congestion episodes for the first 6 hours in the trace are significant in terms of amplitude and persist in time so that they affect the time scale of 10 ms and 100 ms. Observation of the collected statistics at the 100 ms time scale alone when th=50% leads to the same findings. Micro-congestion in the first 6 hours may lead to delays on the order of 1 ms.

Nevertheless, collection of statistics at multiple time scales allows the network operator to investigate the causes of these episodes. If the cause is micro-congestion, then utilization measurements at small time scales should exhibit significant fluctuations. Consequently, not all 1 ms intervals would report utilization levels greater than 50% and some small fraction of those would report significantly higher utilization levels, as is the case for data set 1. On the other hand, if 100% of the 1 ms intervals report utilization levels greater than 50% then there is an indication of persistent congestion that should be further researched.

FIG. 11 shows the results for data set 2, which is the OC-12 data set. Delays experienced by packets through the monitored router are under 100 μs and increase toward the end of the trace. Increase in the single-hop delay occurs after 12 pm. The last 2 hours are characterized by 60% and 80% of the 10 ms and 100 ms intervals respectively exceeding 50% utilization. Approximately 50% of the 1 ms intervals exceed similar levels of activity. The amplitude of the delay can be inferred by observing that 20% of the 1 ms intervals exceed 60% utilization for the same period of time. Nevertheless, given that only the 1 ms timescale reports such high output link utilization values, it is likely that the actual delay values experienced by packets are rather limited. Curves 80-84 represent minimum, average, 90%, 99%, and maximum values respectively.

The above-described methodology is not specific to link utilization measurements. Observing different performance metrics for different levels of activity (th) and across multiple time scales could have further applications. For instance, one could also collect counters for the number of intervals within a 5-minute interval when output queues exceed specific threshold values. Observation of the collected results across time scales can also give insight into how long and how frequently queues reach specific occupancy rates.

From the results, it appears that the most appropriate values of τ should be less than 100 ms for the networks investigated. Extensive monitoring of an operational router may both allow for the identification of the factors affecting micro-congestion episodes and quantification of the effect that different factors have on the measured behavior.

As stated above, currently available SNMP metrics collected over intervals of 5 minutes mask out the existence of short-lived episodes and thus are inappropriate for the link/queue dimensioning of IP links. The proposed methodology for the identification of micro-congestion episodes is capable of characterizing them with respect to their amplitude, duration and frequency. The method generally relies on the analysis of link utilization at multiple time scales simultaneously. This type of analysis can provide great insight into the dynamics of the traffic at small time scales and the impact on the delay experienced by packets.

The time scales at which congestion occurs may in fact vary, but appear to be generally below 100 ms. The data gathered over multiple time scales can then be collected over 5-minute intervals shedding light into the behavior of Internet traffic at these time scales. The collection of such data would provide much greater insight into the dynamic behavior of IP networks than is currently available, as well as what could be obtained by observing performance at a single time scale. Examination of such data, for example, across several links over the same period of time may reveal the manner in which congestion manifests itself globally and/or relates to other events (e.g. link failures, routing table updates. etc).

The present invention has been described in relation to particular embodiments, which are intended in all respects to be illustrative rather than restrictive. Alternative embodiments will become apparent to those skilled in the art to which the present invention pertains without departing from its scope.

From the foregoing, it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and with the scope of the claims.

I claim:

1. A method for monitoring network performance in order to reveal micro-behavior of network traffic, the method comprising:
   monitoring traffic through a router;
   setting at least two distinct time durations over a unidirectional IP link that traverses through the router for monitoring link utilization in the router, wherein the link utilization is a measurement of a use of the unidirectional IP link, wherein the link utilization is monitored simultaneously during each of the at least two distinct time durations, wherein the at least two distinct time durations are based on the size of the network to avoid overloading polled network elements, wherein Global Positioning System time stamps are utilized to monitor a transmission of data through the unidirectional IP link, wherein the router includes a monitoring system that has a processor and a memory, wherein the memory includes timers, statistics calculation tools, and stored statistics, wherein the timers implement different durations of a time scale, and wherein the statistics calculation tool computes link utilization by dividing a collected number of bytes by a capacity of the unidirectional IP link;
   adjusting the at least two distinct time durations over the unidirectional IP link so that congestion can be detected;
   setting at least one link utilization threshold for each distinct time duration in the router;
   monitoring link utilization at the router using a counter;
   identifying intervals of time durations where the at least one link utilization threshold has been exceeded; and
   providing a number of intervals of time durations during which the at least one link utilization threshold has been exceeded.

2. The method of claim 1, further comprising analyzing collected data for a specific time scale across different utilization thresholds in order to determine an amplitude of a micro-congestion episode.

3. The method of claim 2, further comprising analyzing collected data in order to determine frequency of the micro-congestion episode and analyzing collected data for specific values of the at least one link utilization threshold across multiple time scales to determine duration of a micro-congestion episode.

4. The method of claim 1, further comprising setting the distinct durations to 1 ms and 10 ms.

5. The method of claim 1, further comprising collecting monitored data at a pre-set interval.

6. The method of claim 5, further comprising using a 5 minute pre-set interval.

7. The method of claim 1, further comprising setting the link utilization threshold based on network characteristics.

8. A method for monitoring network performance in order to reveal micro-behavior of network traffic, the method comprising:
   monitoring traffic through a router;
   setting at least one distinct duration over a unidirectional IP link that traverses through the router for monitoring link utilization at the router wherein the link utilization is a measurement of a use of the unidirectional IP link where data packets are monitored at the input of the unidirectional IP link and the output of the unidirectional IP link, wherein the size of at least one distinct time duration is based on the size of the network to avoid overloading polled network elements, wherein Global Positioning System time stamps are utilized to monitor a transmission of data packets through the unidirectional IP link, wherein the router includes a monitoring system that has a processor and a memory, and wherein the memory includes timers, statistics calculation tools, and stored statistics, wherein the timers implement different durations of a time scale, and wherein the statistics calculation tool computes link utilization by dividing a collected number of bytes by a capacity of the unidirectional IP link;

adjusting the at least one distinct duration so that congestion can be detected;

setting a collection interval for collecting monitored data at the router, wherein the collection interval is larger than the at least one distinct duration; and analyzing the collected data.

9. The method of claim 8, further comprising setting at least two distinct durations for monitoring link utilization over the unidirectional IP link.

10. The method of claim 9, further comprising setting at least one link utilization threshold for each duration.

11. The method of claim 10, further comprising monitoring link utilization at a the router using a counter.

12. The method of claim 11, further comprising providing a number of durations during which the at least one link utilization threshold has been exceeded.

13. The method of claim 8, further comprising analyzing collected data for a specific time scale across different utilization thresholds in order to determine an amplitude of a micro-congestion episode.

14. The method of claim 8, further comprising analyzing collected data in order to determine frequency of the micro-congestion episode and analyzing collected data from specific values of the at least one link utilization threshold across multiple time scales to determine duration of a the micro-congestion episode.

15. A non-transitory computer-readable medium having computer-executable instructions for performing the method recited in claim 8.

16. A system for monitoring network performance in order to reveal micro-behavior of network traffic, the system comprising:

a processing unit and a memory wherein the memory includes timers, statistics calculation tools, stored statistics, and a data collection apparatus;

the timers implemented by a router for monitoring link utilization during at least two distinct durations over a unidirectional IP link wherein the link utilization is a measurement of a use of the unidirectional IP link, wherein the link utilization is monitored simultaneously during each of the at least two distinct time durations, wherein the at least two distinct time durations are based on the size of the network to avoid overloading polled network elements, and wherein Global Positioning System time stamps are utilized to monitor a transmission of data through the unidirectional IP link;

the statistics calculation tools for implementing a threshold monitor for determining whether link utilization during the at least two distinct durations exceeds the at least two distinct thresholds wherein the statistics calculation tool computes link utilization by dividing a collected number of bytes by a capacity of the unidirectional IP link;

the stored statistics accessible to a network operator;

the data collection apparatus for enabling collection of the link utilization data from the router and for holding data used by the timers and statistics calculation tools;

an operator interface for receiving inputs into the system from a user using an input device such as a keyboard or a pointing device;

a network interface implemented to collect utilization metrics at different time scales; and a system bus implemented to couple the processing unit, the memory, the operator interface, and the network interface.

17. The system of claim 16, wherein the statistics calculation tools determine link throughput based on collected data.

18. One or more non-transitory computer-readable storage media having computer-useable instructions embodied thereon to perform a method for determining parameters for monitoring micro-congestion episodes in a network, the method comprising:

collecting data over at least one time interval having a specified duration, the data including at least a number of packets entering a unidirectional link of a router and a number of packets exiting the unidirectional link of the router wherein the size of at least one distinct time duration is based on the size of the network to avoid overloading polled network elements, wherein Global Positioning System time stamps are utilized to monitor a transmission of data packets through the unidirectional IP link;

determining link throughput based on the collected data;

adjusting the at least one time interval to detect a delay;

calculating delays for each time interval that is adjusted;

relating link throughput with calculated delays;

selecting at least one monitoring time interval based on the relationship between throughput and calculated delays; and analyzing the amplitude, frequency and duration of the micro-congestion episodes based on the collected data wherein the collected data is analyzed for a specific time scale across different utilization thresholds and the collected data is analyzed for specific values of at least one link utilization threshold across multiple time scales.

* * * * *